US012515345B2

(12) United States Patent
Rudy et al.

(10) Patent No.: US 12,515,345 B2
(45) Date of Patent: Jan. 6, 2026

(54) METHOD OF SYNTHESISING TRAINING DATASETS FOR AUTONOMOUS ROBOTIC CONTROL

(71) Applicant: Ocado Innovation Limited, Hatfield (GB)

(72) Inventors: Jan Stanislaw Rudy, Toronto (CA); Borys Bryndak, Toronto (CA); James Sterling Bergstra, Toronto (CA)

(73) Assignee: Ocado Innovation Limited, Hatfield (GB)

( * ) Notice: Subject to any disclaimer, the term of this patent is extended or adjusted under 35 U.S.C. 154(b) by 292 days.

(21) Appl. No.: 18/327,717

(22) Filed: Jun. 1, 2023

(65) Prior Publication Data

US 2024/0399587 A1    Dec. 5, 2024

(51) Int. Cl.
*B25J 9/16* (2006.01)

(52) U.S. Cl.
CPC ............. *B25J 9/1697* (2013.01); *B25J 9/163* (2013.01); *B25J 9/1653* (2013.01); *B25J 9/1679* (2013.01)

(58) Field of Classification Search
CPC ........ B25J 9/1697; B25J 9/163; B25J 9/1653; B25J 9/1679; G05B 2219/40053; G05B 2219/45063
See application file for complete search history.

(56) References Cited

U.S. PATENT DOCUMENTS

| | | | | |
|---|---|---|---|---|
| 2021/0078167 A1* | 3/2021 | Khansari Zadeh | ....... | G06T 7/90 |
| 2023/0150777 A1* | 5/2023 | Skyum | ...................... | B07C 5/02 |
| | | | | 700/245 |
| 2023/0368052 A1* | 11/2023 | Li | .......................... | G06N 5/046 |
| 2024/0096069 A1* | 3/2024 | Shapiro | ..................... | G06T 7/50 |
| 2024/0109191 A1* | 4/2024 | Aikens | .................. | B25J 9/1679 |

OTHER PUBLICATIONS

International Search Report and Written Opinion, dated Nov. 22, 2024, for International Patent Application No. PCT/EP2024/064948. (17 pages).

* cited by examiner

*Primary Examiner* — Abby Lin
*Assistant Examiner* — Danielle M Jackson
(74) *Attorney, Agent, or Firm* — Seed Intellectual Property Law Group LLP

(57) ABSTRACT

The present disclosure relates to a computer-implemented method of synthesising a training dataset for training a comparison function of a machine learning service in the detection of a multi-pick event in which a robotic manipulator erroneously picks two or more items concurrently, the method comprising: selecting first image data representative of an image of a plurality of items to be picked by the robotic manipulator; selecting intermediate image data representative of an image of the plurality of items following the removal, by the robotic manipulator, of an item from the plurality of items; selecting final image data representative of an image of the plurality of items following the removal, by the robotic manipulator, of another item from the plurality of items; and, generating the training dataset representative of a notional multi-pick event based on a sequence of unlabelled image data consisting of the first and final image data.

4 Claims, 7 Drawing Sheets

METHOD OF SYNTHESISING TRAINING DATASETS FOR AUTONOMOUS ROBOTIC CONTROL

TECHNICAL FIELD

The present disclosure relates generally to the field of robotic control and, more specifically, to producing training datasets for training a machine learning service in a robotic control system.

BACKGROUND

Machine learning services that often facilitate autonomous robotic control require a large amount of training data in order for them to be trained for a particular function. In some cases the function may relate to a situation that occurs relatively infrequently, making it difficult to source enough data to train a machine learning service sufficiently.

Therefore, there is a need for a method of synthesising training data for training a machine learning service for a function related to infrequently occurring events.

SUMMARY

Accordingly, there is provided, in a first aspect, a computer-implemented method of synthesising a training dataset for training a comparison function of a machine learning service in the detection of a multi-pick event in which a robotic manipulator erroneously picks two or more items concurrently, the method comprising: selecting, from a dataset of unlabelled image data, first image data representative of an image of a plurality of items to be picked by the robotic manipulator; selecting, from the dataset of unlabelled image data, intermediate image data representative of an image of the plurality of items following the removal, by the robotic manipulator, of an item from the plurality of items; selecting, from the dataset of unlabelled image data, final image data representative of an image of the plurality of items following the removal, by the robotic manipulator, of another item from the plurality of items; and, generating the training dataset representative of a notional multi-pick event based on a sequence of unlabelled image data consisting of the first and final image data.

This augmentation method can produce image data showing the result of removing multiple items with multiple picks. This image data can be used to generate training datasets to teach the machine learning service to recognise the visual effect of removing multiple items with multiple picks, and then use it to detect accidental multi-item grasps from a single pick, on the basis that the visual effect is similar.

Optionally, the dataset of unlabelled image data is representative of a sequence of images of the plurality of items to be picked by the robotic manipulator captured over a predetermined period of time.

Optionally, the method further comprises removing from the dataset of unlabelled image data all image data captured during a control cycle of the robotic manipulator in which the robotic manipulator failed to remove an item from the plurality of items.

Optionally, the method further comprises selecting from the dataset of unlabelled image data the intermediate unlabelled image data within a predetermined period following the removal of the item from the plurality of items; and, selecting from the dataset of unlabelled image data the final unlabelled image data within a predetermined period following the removal of the other item from the plurality of items.

According to another aspect, there is provided a data processing apparatus comprising means for carrying out the method according to the first aspect.

According to another aspect, there is provided a robotic control system comprising one or more processors and computer-readable memory storing executable instructions that, as a result of being executed by the one or more processors, cause the computer to carry out the method according to the first aspect.

According to another aspect, there is provided a non-transitory processor-readable storage device having stored thereon a set of instructions, which if performed by one or more processors, cause the one or more processors to perform the method according to the first aspect.

According to another aspect, there is provided a machine learning service trained to detect multi-pick events using a training dataset generated by the method according to the first aspect.

According to another aspect, there is provided a robotic picking system comprising a robotic manipulator; a robotic control system; a picking area from which the robotic manipulator picks items; an imaging system and a machine learning service according to the previous aspect, wherein the robotic control system is configured to output a signal suitable for causing the robotic manipulator to pick an item from a plurality of items within the picking area; before stowing the item, determine, based on a signal outputted from the machine learning service, whether or not the robotic manipulator has erroneously picked two items concurrently; and, if it is determined that the robotic manipulator has picked two items concurrently, output a signal suitable for causing the robotic manipulator to return the items back in the picking area.

BRIEF DESCRIPTION OF THE DRAWINGS

These and other aspects of the invention will now be described, by way of example only, with reference to the accompanying drawing, in which.

DETAILED DESCRIPTION

Figure 1:
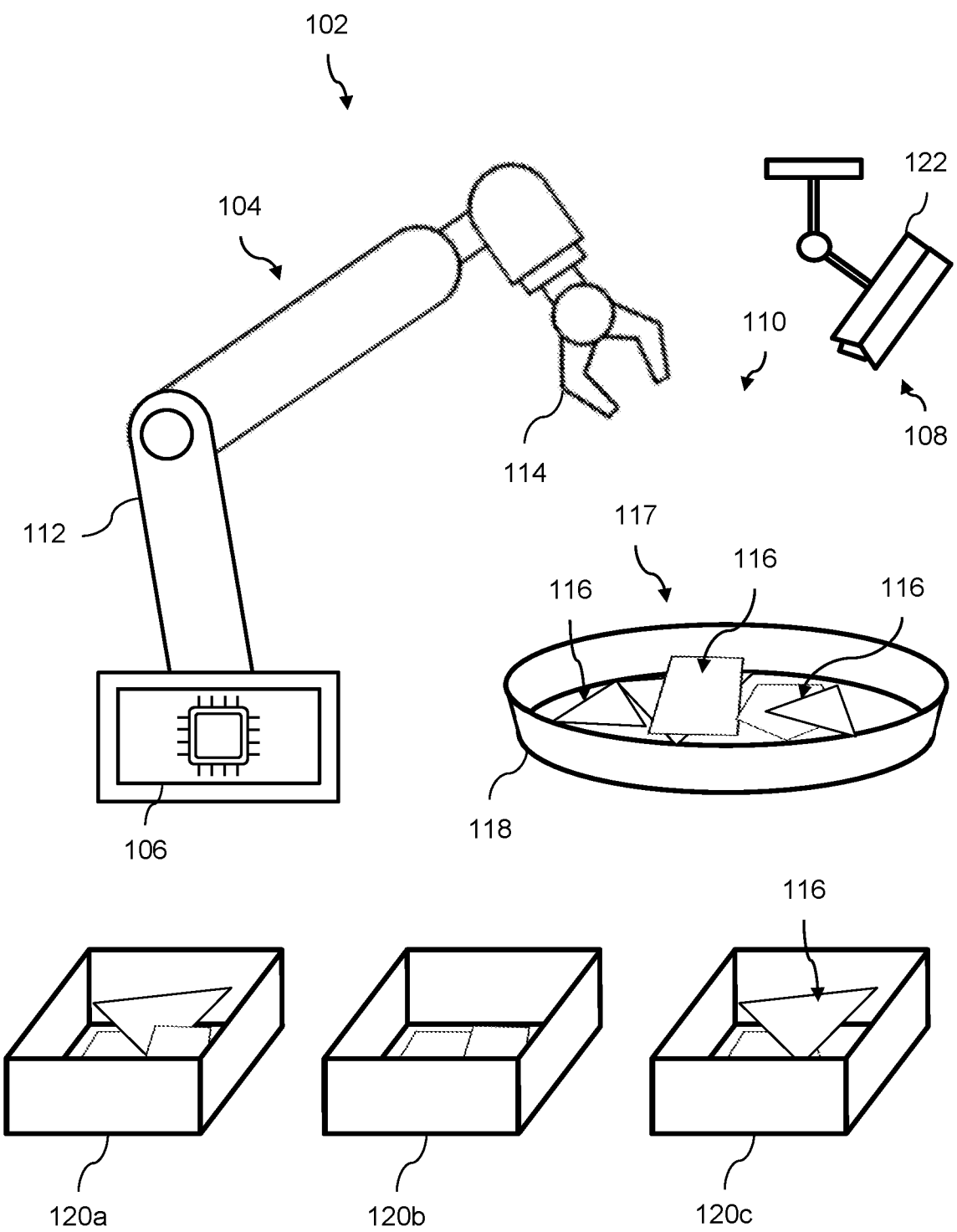
FIG. 1 is a schematic depiction of a robotic manipulator and a robotic control system with an imaging device within a workspace according to an embodiment of the invention.

FIG. 1 is a schematic diagram illustrating an autonomous robotic picking system 102 comprising a robotic manipulator 104 and a robotic control system 106 comprising an imaging device 108 within a workspace 110. The robotic manipulator 104 comprises a robotic arm 112 and an end-effector 114 fastened to a terminal end portion of the robotic arm 112. The robotic manipulator 104 can be floor mounted, possibly using a floor-standing pedestal, or can be wall-mounted. In other embodiments, the robotic manipulator 104 is mounted above the workspace 110, such as on a ceiling support or crossbeam, a cantilevered beam or a sidewall.

The end-effector 114 is a robotic gripper having two or more gripping fingers, where each of the fingers can be actuated electrically, mechanically, and/or pneumatically. The fingers can be parallel fingers, jaws, adaptive fingers, hyper-adaptive fingers, and the like. In an alternative embodiment, the end-effector 114 can include a vacuum suction mechanism, force-torque sensors, tooling, tool changers, spraying and discharging nozzles, magnets, and the like.

The end-effector 114 is configured to manipulate items 116 located in, for example, a pick area 117, which in this example is defined by a pick bin 118. The end-effector 114 is configured to pick items 116 from the pick bin 118 and place the items 116 into a second area, such as placement bins 120a, 120b, 120c, in order to fulfil one or more orders. In another example, the pick bin 118 might be surrounded by, or located adjacent to, sorting stations, conveyor belts, transfer vehicles, or other areas in which the robotic manipulator 104 can place items 116 selected from the pick bin 118. The items 116 can have different shapes, sizes, dimensions, volumes, and weight or alternatively, be of a substantially uniform shape and relatively identical. The pick and placement bins 118, 120a, 120b, 120c are shown as an illustrative, non-limiting example of a sorting station where an unorganised collection of items 116 is deposited in the pick bin 118 and stored, by the robotic manipulator 104, into specific item combinations in placement bins 120a, 120b, 120c. However, a myriad of other sorting station arrangements and equipment can be utilised within the scope of the invention.

The imaging device 108 is utilised to capture visual or image data relating to, for example, regions of interest, such as the pick area 117, through which data on the identity, number and distribution of the items 116 within the pick bin 118 may be obtained. The imaging device 108 may also be configured to sense, detect, and capture other types of data, such as visual and motion data of the end-effector 114 and/or the item 116 grasped therein. To that end, the imaging device 108 comprises at least one camera 122. The camera 122 may be mounted on a gimbal or the like, allowing it to be repositioned to any desired field of view relative to the robotic manipulator 104 and/or the item 116 to be manipulated. In another embodiment, the imaging device 108 includes an imaging system with multiple cameras, where each camera is mounted on a respective gimbal. In yet another embodiment, the imaging device 108 includes at least one camera mounted on a gimbal, and at least one camera located on a fixed or movable mount.

While FIG. 1 depicts a workspace 110 with a robotic manipulator 104 configured for pick-and-place operations, it is understood that the system 102 could be implemented in any setting where a robotic manipulator 104 may be useful, such as in various stages in a supply chain, assembly line, manufacturing environment, storage and warehouse facility, sorting stations, laboratory, and retail and commercial settings.

Figure 2:
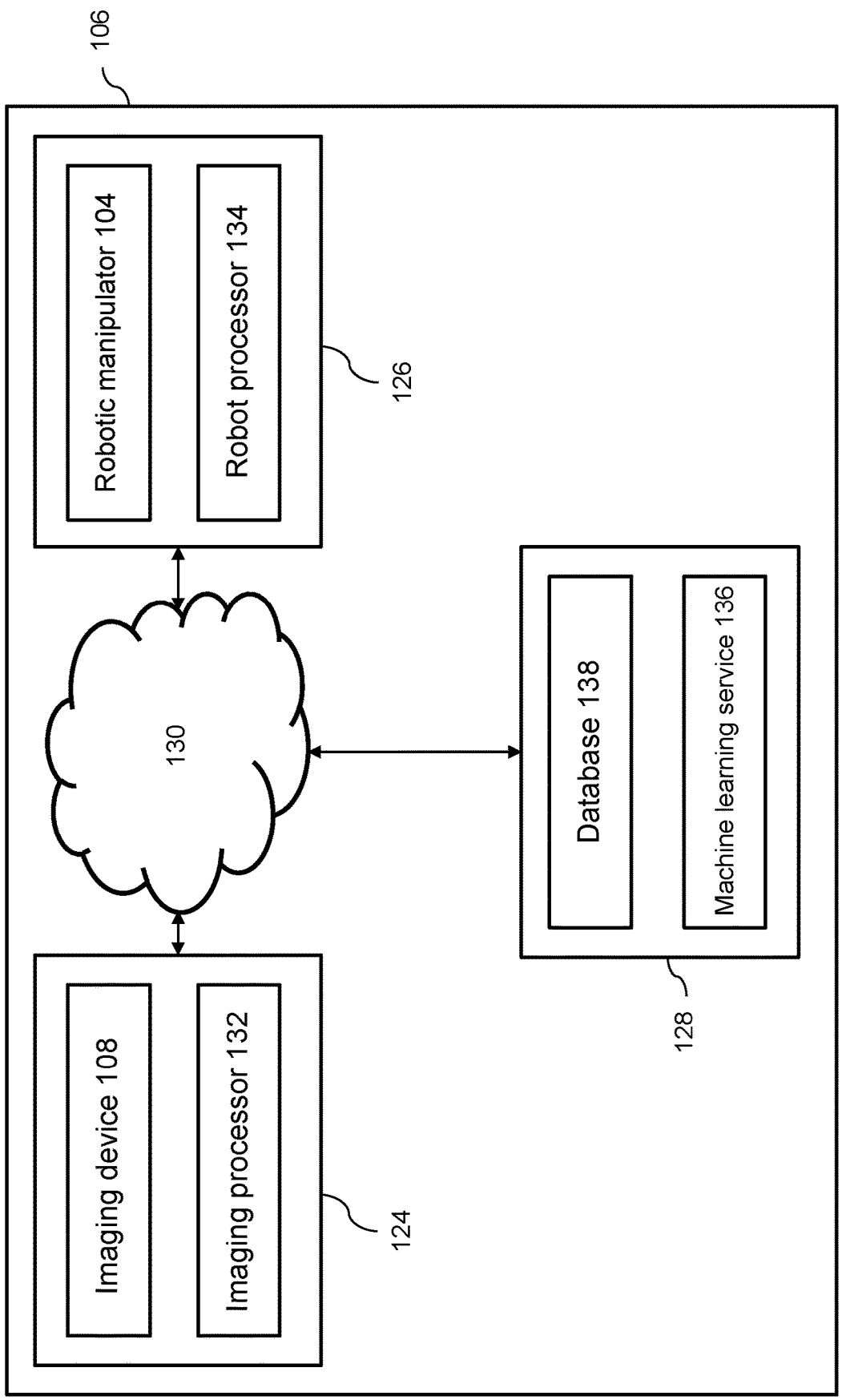
FIG. 2 is a network architecture diagram of a robotic control system, according to an embodiment of the invention.

FIG. 2 is a network architecture diagram of the robotic control system 106 according to an embodiment of the invention. The robotic control system 106 comprises an imaging system 124, a robot system 126, and a machine learning system 128 communicatively coupled to a wired and/or wireless network 130. The imaging system 124 includes the imaging device 108 and an imagining processor 132 to which the imaging device 108 is communicatively coupled. The robot system 126 includes a robot processor 134 communicatively coupled to the robotic manipulator 104, and the machine learning system 128 includes a machine learning service 136 and a database 138.

In an embodiment, the network 130 is a wireless network, and the imaging system 124 and the robot system 126 include wireless transceivers capable of receiving and transmitting data over the wireless network.

In another embodiment, the network 130 is a hard-wired network, and the imaging system 124 is coupled to the robot system 126 via wired links (not shown). The wired links can be, for example, high-definition (HD) over coaxial cabling that utilises a split coaxial data cable and power cables, power-over-Ethernet (POE) cabling that utilises, for example, Cat5e or Cat6 Ethernet cable, BNC cabling, DIN cabling, RCA cabling, HDMI cabling, FireWire cabling, USB cabling, and any other type of suitable analogue or digital cabling.

The processors 132, 134 include a processing unit that can include, but is not limited to, a vision processing unit (VPU), a graphic processing unit (GPU), a Tensor processing unit (TPU), an artificial intelligence accelerator application-specific integrated circuit (AI accelerator ASIC), a neural processing unit, a cognitive computing unit, a central processing unit (CPU), or one or more of any other purpose-built processor suitable for AI and Internet-of-Things (IoT) computing.

The processors 132, 134 can operate in a distributed fashion and share processing functions. For example, the imaging processor 132 can be configured to perform required video processing and analysis functions, such as, but not limited to, object identification, portioning video feed segments, localising objects within the video feed, redaction of non-relevant artefacts in the video feed, tagging of objects, trajectory and movement analysis, and the like. In an embodiment, the robot processor 134 can be configured to perform some of the required video processing and analysis functions, and the remaining functions can be performed by the imaging processor 132. The processors 132, 134 can determine the functions that it will perform, based on, for example, the amount of available processing resources, anticipated latency, anticipated bandwidth required, available bandwidth, and the like.

Moreover, the processors 132, 134 can include video and image compression and coding processors. For example, captured video data can be compressed, such as by, for example, the use of high efficiency video coding (HEVC), also known as H.265 and MPEG-H Part 2, or advanced video coding (AVC), also known as H.264 and MPEG-4 Part 10.

In an embodiment, the robot processor 134 can be located remotely from the robotic manipulator 104, such that the robot system 126 is a distributed system. In this embodiment, the robot system 126 and imaging system 124 can be located at a first location, such as a factory or warehouse, and the robot processor 134 can be located at a second location, such as at a teleoperation centre, remote monitoring centre, a remote server, a cloud location, and the like.

The machine learning system 128 can receive various operational data from the imaging and the robot systems 124, 126. Such data can include, but is not limited to, yaw, pitch, roll, acceleration, motion, orientation, load, strain, stress, fatigue, health of the robotic manipulator 104, and/or field of view, resolution, zoom of the imaging device 108. In addition, the data can include information related to the number and distribution of the items 116 within the pick area 117, and other information relating to the items 116 such as weight, dimensions, edges, contours, colours, volume, flexibility, hardness, softness, durometer values, slippage while grasped by the end-effector 114, occlusion of the object 116 while being grasped by the end-effector 114, and the like. The robot processor 134 can also receive this various operational data and generate commands for the robotic manipulator 104 and/or the imaging processor 132.

The machine learning system 128 is also configured to process the operational data received from the processors 132, 134. The data can be stored on the database 138 of the machine learning system 128. The database 138 can be a relational database, a SQL database, an object-oriented database, a centralised database, or a distributed database, such as a cloud-based database or a blockchain-based database stored across a distributed ledger. In processing the data, the machine learning system 128 may apply one or more machine learning algorithms to the data. For example, by processing the data, the machine learning system 128 might analyse time-varying parameters of the data to determine and predict pose geometries for the robotic manipulator 104 based on the type(s) of objects 116 in the workspace 110, as well as based on the particular type of robotic manipulator 104 and end-effector 114 being utilised.

Figure 3:
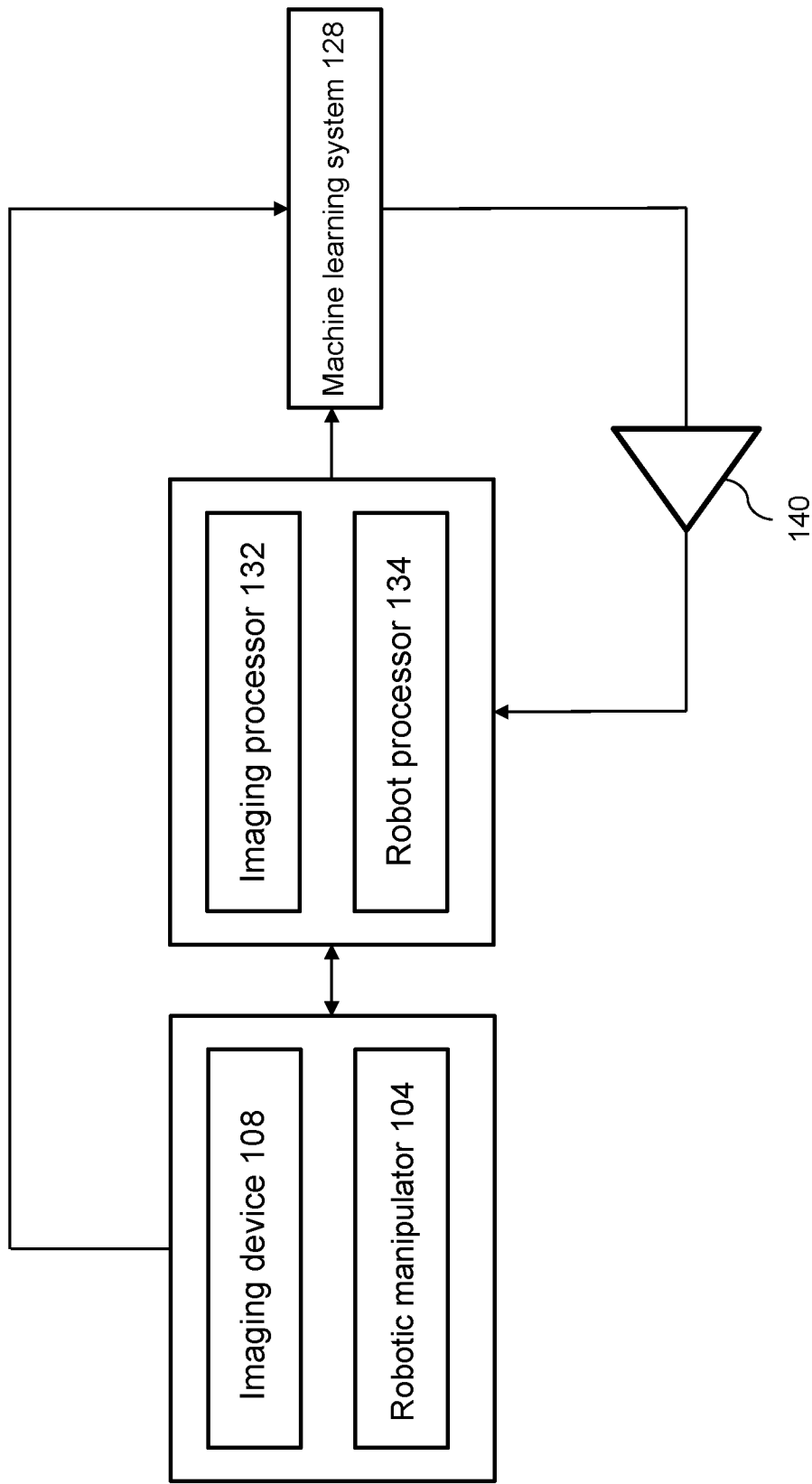
FIG. 3 is a block diagram illustrating the network architecture diagram of the robotic control system shown in FIG. 2, according to an embodiment of the invention.

FIG. 3 is a block diagram of the network architecture diagram shown in FIG. 2. The imaging device 108 and robotic manipulator 104 communicate with their respective processors, which, as shown, include at least the imaging and robot processors 132, 134. The imaging device 108 and robotic manipulator 104 can transmit various operational data to their respective processors 132, 134, which are configured to process and analyse the operational data, and generate control commands for the imaging device 108 and robotic manipulator 104. For example, the imaging processor 132 can receive video and image data from the imaging device 108, and can process the data to determine, for example, a resolution of the video feed, zoom values of the imaging device 108, a range or distance between the imaging device 104 and the end-effector 114, a determination if the end-effector 114 and/or item 116 is fully contained within the captured field of view, and the like. The processors 132, 134 can then generate a command to adjust the zoom level of the imaging device 108 in order to enhance the focus of the video feed, to adjust its position so that the captured field of view of the imaging device 108 is changed, etc. The operational data from the imaging device 108 and robotic manipulator 104, as well as the commands generated by the processors 132, 134, can all be fed to the machine learning system 128.

The machine learning system 128 can store and process all of the data received from the imaging device 108 and robotic manipulator 104, and/or the processors 132, 134, such as, but not limited to, operational data, data related to a comparison of the captured field of view relative to a region of interest, commands generated by the processors 132, 134, region of interest information, i.e., information regarding the number and distribution of items 116 in the pick area 117, and tracking data related to the object 116 being manipulated.

In an embodiment, the machine learning system 128 may apply one or more machine learning algorithms to the received data. Specifically, the machine learning system 128 can analyse time-varying values in the data (i.e., such as movements to, and adjustments made to, the robotic manipulator 104 and imaging device 108) and static values (i.e., properties and/or features of the object 116, bins 118, 120*a*, 120*b*, 120*c*, workspace 110, robotic manipulator 104 and/or imaging device 108) that characterise the manipulation of a particular object or type of object over a period of time. The machine learning system 128 can use this analysis to establish a correlation between these time-varying and static values. These correlations can be utilised by the processors 132, 134 to predict how to control operation, movements, and adjustments to the imaging device 108 and/or robotic manipulator 104 during a future time period when a particular object or type of object is being manipulated. By using machine learning to analyse historical data, the robotic control system 106 can proactively control the imaging device 108 and/or robotic manipulator 104 in an anticipated or predicted fashion through the feedback 140 sent to one or more of the processors 132, 134, thereby reducing system lag due to processing, and reducing network bandwidth as operational data and related processing thereof is minimised. The machine learning system 128 might also be utilised for motion planning on the robotic manipulator 104, allowing the robotic control system 106 to predictively control movements, adjustments, motions, and the like of the robotic manipulator 104. For example, in an exemplary scenario, an item 116 being manipulated may need to be tracked as the robotic manipulator 104 performs a pick-and-place operation. In this scenario, the machine learning system 128 can be utilised to coordinate control of the imaging system 124 with the robot system 126 so that the robotic manipulator 104 can successfully complete an intended pick-and-place task.

Figure 4:
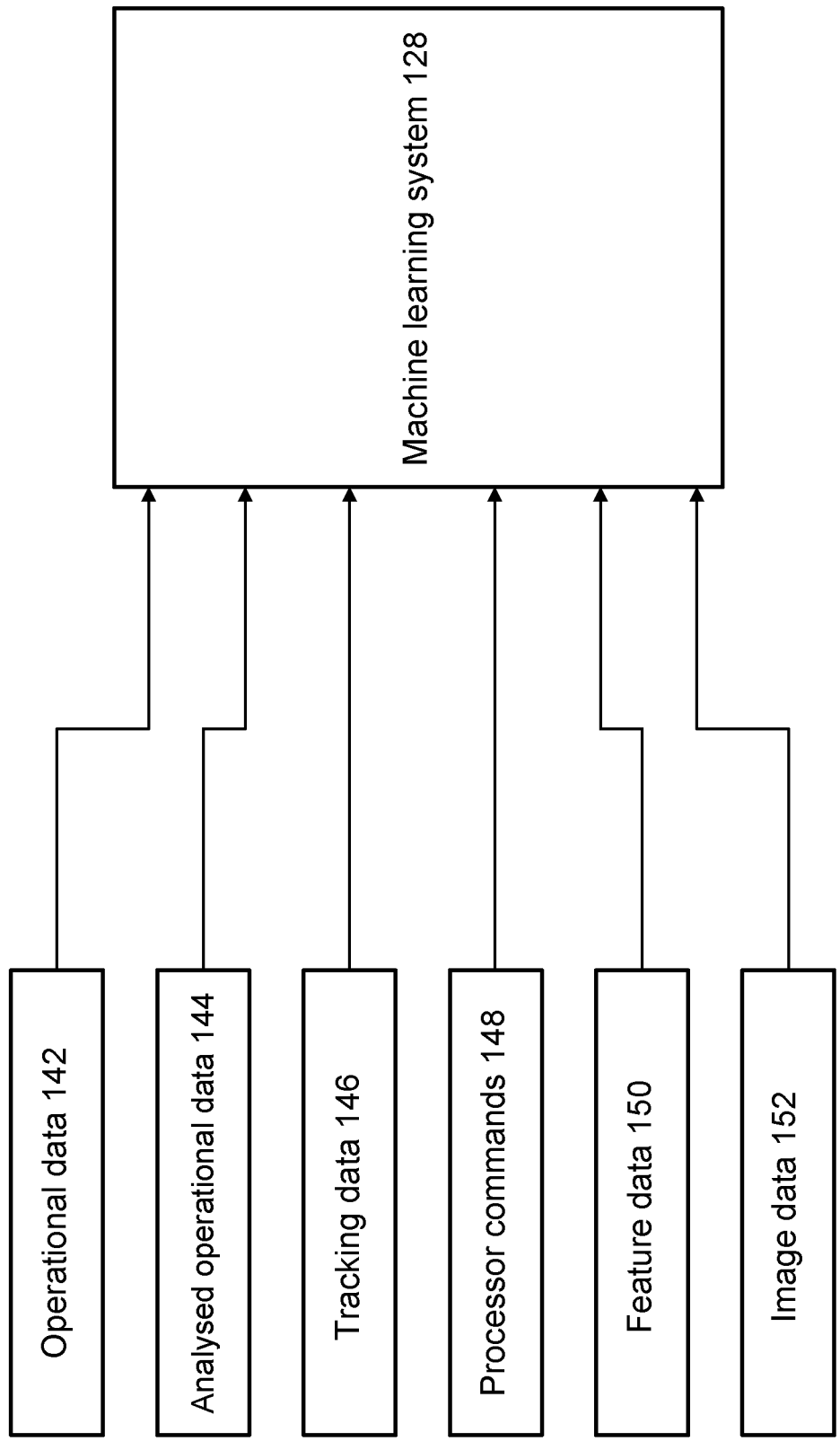
FIG. 4 is a block diagram illustrating active-perception based inputs to a machine learning system of an active perception-based robotic control system, according to an embodiment of the invention.

FIG. 4 is a block diagram illustrating active-perception based inputs to the machine learning system 128 of the robotic control system 106. The machine learning system 128 can receive suite of data streams, including:
- operational data 142 from the imaging device 108 and robotic manipulator 104, such as, but not limited to, yaw, pitch, roll, acceleration, motion, orientation, load, strain, stress, fatigue, health, field of view, zoom levels, and the like;
- analysed operational data 144 from one or more of the processors 132, 134, such as, but not limited to, resolution of the captured data (i.e., resolution of the video feed or still image), distances between items 116 in the captured data, and the like;
- tracking data 146 related to the item 116 and/or region of interest, such as, for example, waypoints within the workspace 110;
- Command data 148 generated by one or more of the processors 132, 134 in response to analysing the operational data from the imaging device 108 and robotic manipulator 104. For example, commands to manipulate, adjust, move, or otherwise modify the operation of any of the imaging device 108 and robotic manipulator 104 by their respective processors 132, 134 can be fed to the machine learning system 128. In an embodiment, the machine learning system 128 can utilise the command data 148 to determine when and how certain commands were generated;

feature data 150 related to the workspace 110, robotic arm 112, end-effector 114, pick bin 118 or an item 116, such as, but not limited to, weight, dimensions, edges, contours, colours, volume, flexibility, hardness, softness, durometer values, slippage while grasped by the end-effector 114, occlusion of the item 116 while being grasped by the end-effector 114, as well as features such as data extracted from text, numbers, letters, alphanumeric characters, character strings, logos, images, designs, colours, markings, labels, and tags located on the item 114 and/or region of interest; and, image or visual data 152 related to regions of interest within the workspace 110, such as the pick area 117. Such data can include binary values (i.e., yes or no) related to if a particular captured field of view adequately contains a region of interest, relative values as to how accurate a particular field of view is with respect to adequately capturing a region of interest (i.e., upper portion or 10% of a region of interest not captured, etc.).

The machine learning system 128, in particular the machine learning service 136, may apply machine learning algorithms to the image or visual data 152 with a view to identifying instances where the robotic manipulator 104 fails to carry out a successful pick-and-place operation. Pick-and-place operations may be considered as failed for several reasons. One example of a failed pick-and-place operation is when the robotic manipulator 104 erroneously picks from the pick area 117 two or more items 116 at the same time, instead of a single item 116, leading to items 116 being placed in an incorrect placement bin 120*a*, 120*b*, 120*c*. The cost penalty associated with this and similar errors is potentially high, particularly if they aren't immediately identified and corrected, even if the frequency at which they occur is relatively low. It is possible to train a comparison function on the machine learning service 136 to identify such "multi-pick events" based on the received image data 152. Upon the successful determination of a multi-pick event by the machine learning service 136, the robot processor 134 commands the robotic manipulator 104 to abandon its current pick, thus putting back the items 116 in the pick area 117, and return to its home position ready for a subsequent pick-and-place operation.

The comparison function may be executed by a plurality of machine learning algorithms forming a neural network. The general function and architecture of neural networks will already be familiar to the skilled person, and so will not be described in detail here. It is however known that a neural network undergoes what is commonly referred to as a "training phase", in which it is trained for a particular purpose, using a large amount of image data comprising 1,000s or 10,000s of images, to identify overall characteristics of an image (i.e., whether the image includes an object of a particular class or a particular instance belonging to the particular class) or to identify other characteristics of the image. In this instance, the neural network is trained to recognise a multi-pick event using a training dataset of image data representative of an image of a plurality of items 116 to be picked by the robotic manipulator 104. However, as suggested above, multi-pick events are a reasonably rare occurrence, and so it would take a prohibitive amount of time to assemble an adequately sized training dataset in order to train the machine learning service 136.

Figure 5:
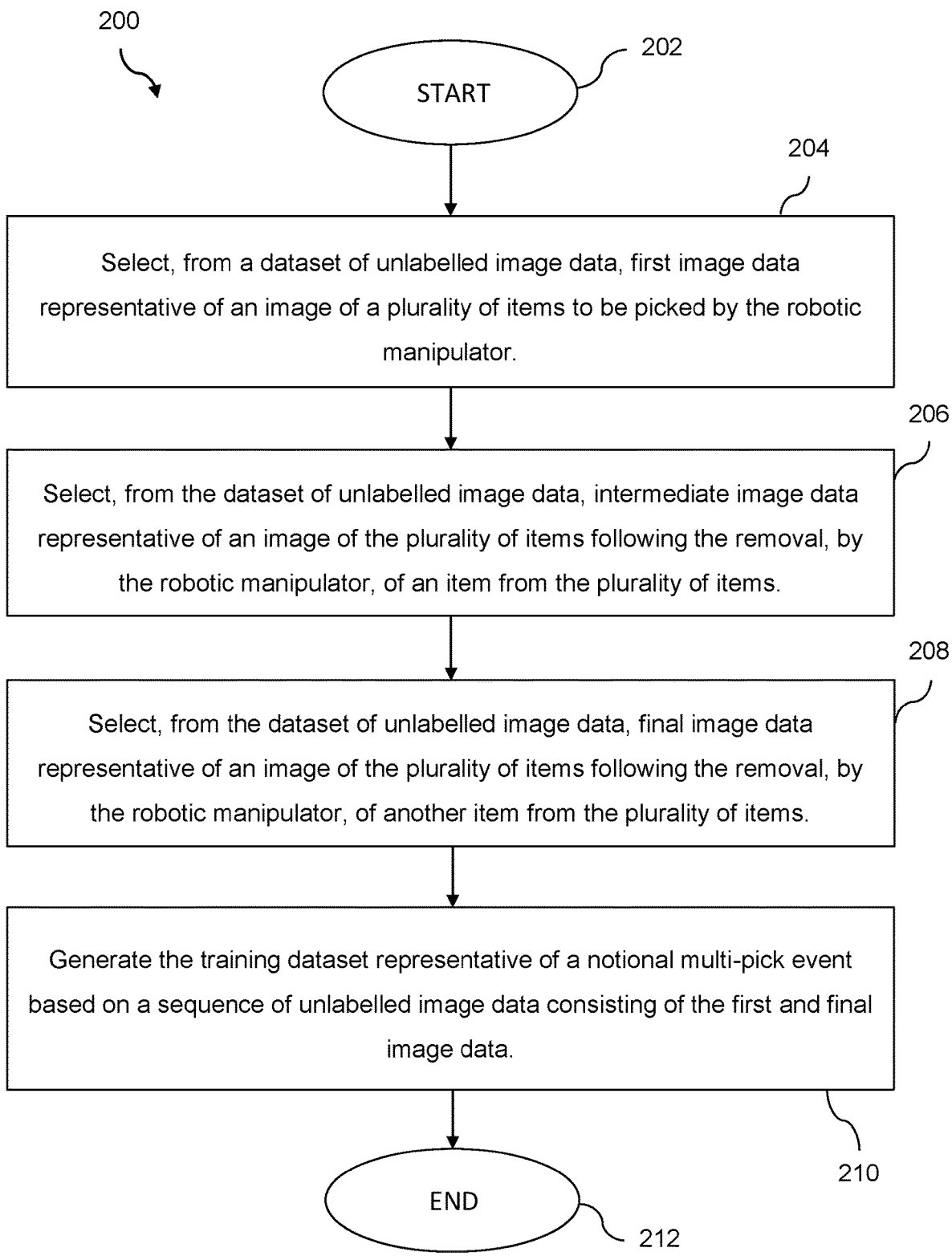
FIG. 5 is a flowchart illustrating the steps for generating a training dataset for training a machine learning service in identifying instances where the robotic manipulator has erroneously picked up two or more items, according to an embodiment of the invention.

FIG. 5 shows a method 200 that may be implemented by one or both of the processors 132, 134, or another data processing apparatus of the robotic control system 106 or a control subsystem, executing one or more sets of processor-executable instructions and/or data stored on the database 138 of the machine learning system 128, or on one or more non-transitory processor-readable storage devices that also form part of the robotic control system 106. The method 200 is a method of synthesising a training dataset for training the machine learning service 136 in the detection of a multi-pick event (e.g., a double-pick event).

The method 200 begins at 202 and moves to step 204, where the robotic control system 106 selects, from a dataset of unlabelled image data, first image data representative of an image of a plurality of items 116 to be picked by the robotic manipulator 104. The dataset of unlabelled image data might be a sequence of images of the plurality of items 116 to be picked by the robotic manipulator 104 captured over a predetermined period of time. The dataset of unlabelled image data might have already been amended in order to reduce its size by removing all image data captured during a control cycle of the robotic manipulator in which the robotic manipulator 104 failed to remove an item 116*a*, 116*b* from the plurality of items 116. Within the context of the present example of the robotic picking system 102, the first image data may be acquired by selecting from a suite of images or video of the pick area 117 obtained from the imaging system 124 and stored on the database 138 or another non-transitory processor-readable storage device forming part of the robotic control system 106. The selected image of the pick area 117 may be from the first half of robotic manipulator's 104 control cycle, before the robotic manipulator 104 picks an item 116 from the pick area 117, or from the latter half of the control cycle, after the robotic manipulator 104 has picked the item 116, provided that, in both instances, the pick area 117 contains three or more items 116.

The method 200 then proceeds to step 206, where the robotic control system 106 selects, from the dataset of unlabelled image data, intermediate image data representative of an image of the plurality of items 116 following the removal, by the robotic manipulator 104, of an item 116 from the plurality of items 116. The first and intermediate image data may be obtained from images of the pick area 117 during a single control cycle of the robotic manipulator 104. For example, the first image data might be based on images from the first half of the robotic manipulator's 104 control cycle, preceding the picking of an item 116, and the intermediate image data can be based on images of the pick area 117 obtained during the latter half of same control cycle, following the item's 116 removal from the pick area 117 by the robotic manipulator 104. Alternatively, in those instances where the first image data is based on an image of the plurality of items 116 during the latter half of the control cycle, the intermediate image data should be based on an image of the plurality of items 116 during the latter half of a subsequent control cycle. Alternatively, the control system 106 may select from the dataset of unlabelled image data the intermediate unlabelled image data within a predetermined period following the removal of the item from the plurality of items 116 to ensure that the first and intermediate image data are obtained from different control cycles.

The method 200 then proceeds to step 208, where the robotic control system 106 selects, from the dataset of unlabelled image data, final image data representative of an image of the plurality of items 116 following the removal, by the robotic manipulator 104, of another item 116 from the plurality of items 116. In those instances where the first and intermediate image data is based on images from the same control cycle of the robotic manipulator 104, the final image data will be acquired using an image of the plurality of items 116 from the latter half of a subsequent control cycle. Alternatively, if the first and intermediate image data is based on images from first and subsequent control cycles respectively, the final image data will be based on an image of the plurality of items 116 during the latter half of a further control cycle. Alternatively, the control system 106 may select from the dataset of unlabelled image data the final unlabelled image data within a predetermined period following the removal of the other item from the plurality of items 116 to ensure that the intermediate and final image data are obtained from different control cycles.

With the first, intermediate and final image data selected, the method 200 proceeds to step 210, where the robotic control system 106 generates the training dataset representative of a notional multi-pick event based on a sequence of unlabelled image data consisting of the first and final image data for training the machine learning service 136 in the detection of a multi-pick event. Following this, the method 200 ends at step 212 until invoked again. Those of skill in the art will appreciate that other acts or steps may be included, removed, and/or varied or performed in a different order to accommodate alternative implementations of the method 200. For example, the method 200 requires the removal of at least two items 116 from the plurality of items so as to be able to generate a training dataset representative of a notional "double-pick event". However, further steps might be added to the method 200 so that, for example, three items 116 are removed in order to generate a training dataset representative of a notional "triple-pick event".

The method 200 is illustrated with reference to FIGS. 6 and 7.

Figure 6A:
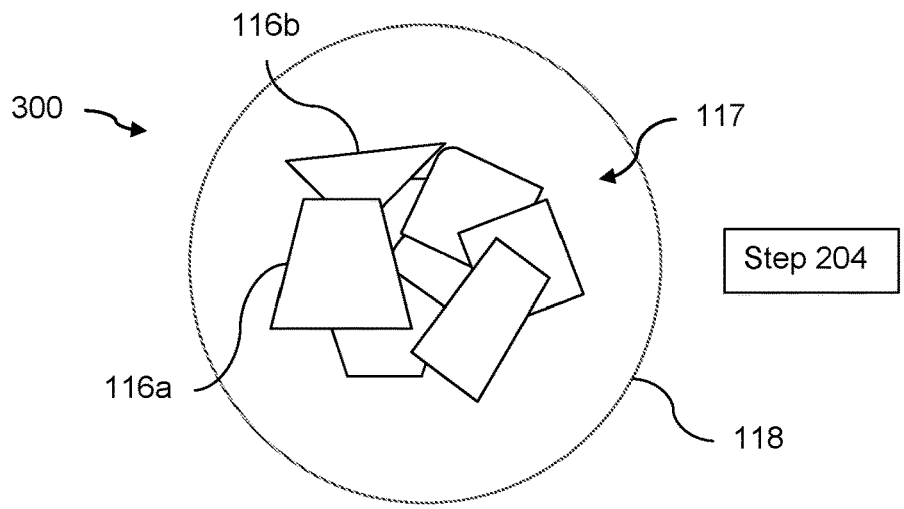
FIGS. 6A-6C are a series of depictions illustrating some of the steps of the flowchart in FIG. 5; and, FIG. 7 is a series of depictions illustrating the remaining steps of the flowchart in FIG. 5.
Figure 7:
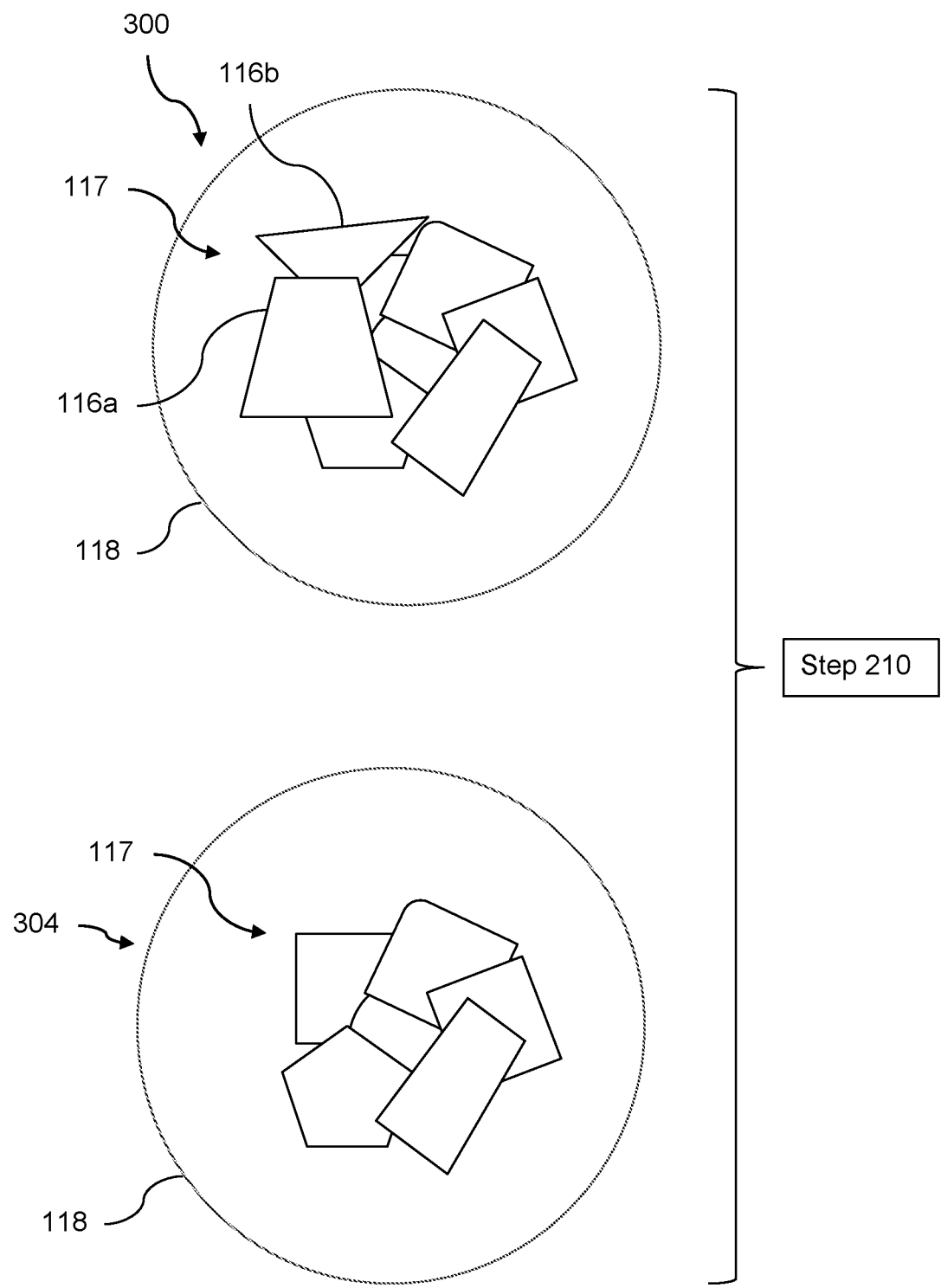

FIG. 6A is a schematic representation of a first image 300 of the pick area 117 comprising a plurality of items 116 to be picked by the robotic manipulator 104, including first and second items 116a, 116b. The image 300 might constitute unstructured data in that it is raw information from the imaging system 124. That is, no processing or analysis functions have been applied to the image 300. Accordingly, despite the first and second items 116a, 116b being labelled as such for ease of explanation, insofar as the robotic control system 106 is concerned, the image 300 comprises unlabelled image data of the sort from which the first image data might be selected at step 204 of the method 200.

Figure 6B:
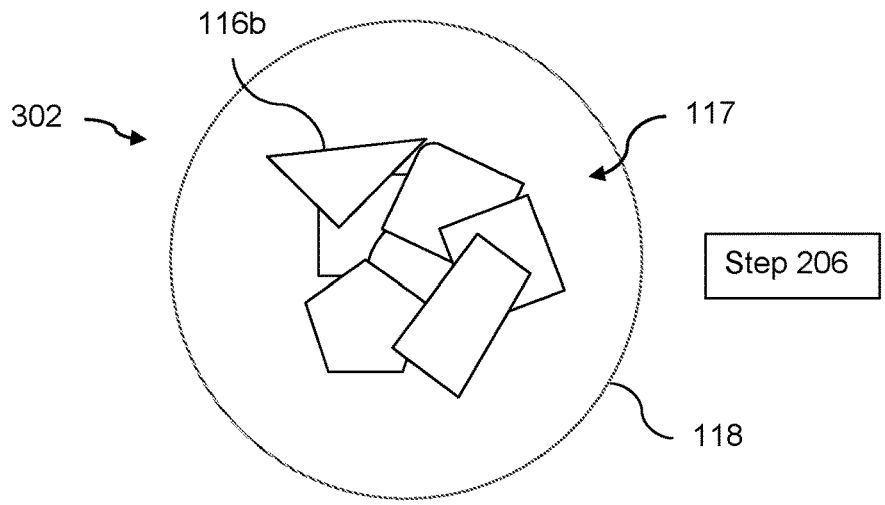

FIG. 6B is a schematic representation of a second image 302 of the pick area 117 following the removal of the first item 116a from the plurality of items 116. It is from this image 302 that the robotic control system 106 might select the intermediate image data at step 206 of the method 200.

Figure 6C:
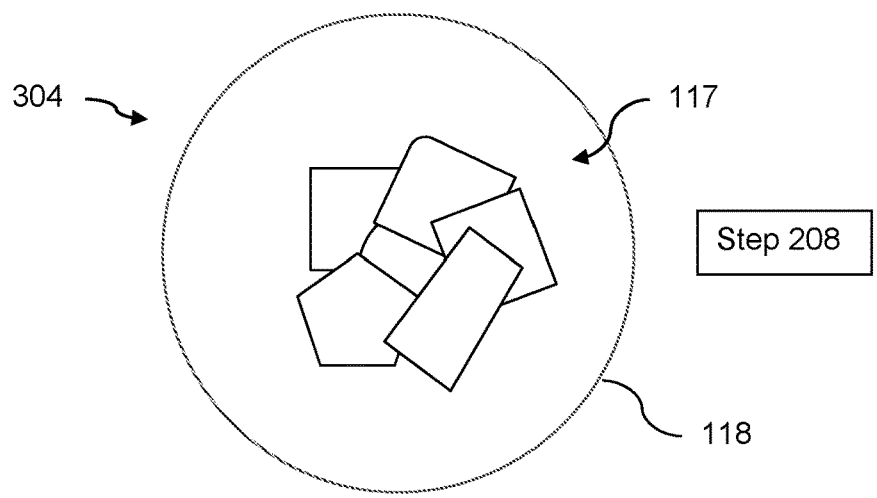

FIG. 6C is a schematic representation of a third image 304 of the pick area 117 following the removal of the second item 116b from the plurality of items 116. It is from this image 304 that the robotic control system 106 might select the final image data at step 208 of the method 200.

In this example, FIGS. 6A-6C shows an initial image of the pick area 117 comprising a plurality of items 116 and two further images of the pick area 117 following two consecutive picks. The robotic control system 106 derives the first, intermediate and final image data from these images and uses that data to construct the training dataset that represents a notional multi-pick event based on a sequence of unlabelled image data consisting of the first and final image data. This step constructing or generating the training dataset is step 210 of the method 200 and is illustrated in FIG. 7, which shows the effective removal of the second image 302 (i.e., the intermediate image data) from the sequence of image data, leaving only the first and third images 300, 304 (i.e., the first and final image data) thereby creating, in this example, a notional double-pick event in which items 116a, 116b have been removed from the pick area 117 after a single picking cycle. This method 200 makes use of a large dataset of unlabelled image data largely comprising only "single pick events", where only one item 116 is removed from the pick area 117 per picking cycle, to construct a training dataset for training the machine learning service 136 in identifying a multi-pick event, such as a double- or triple-pick event, which is a reasonably rare occurrence.

The invention claimed is:

1. A robotic picking system comprising:
   a robotic manipulator;
   a robotic control system;
   a picking area from which the robotic manipulator picks items;
   an imaging system; and,
   a machine learning service trained to detect multi-pick events using a training dataset generated by a method of training a machine learning service, the method comprising:
      selecting, from a dataset of unlabeled image data, first image data representative of an image of a plurality of items to be picked by the robotic manipulator;
      selecting, from the dataset of unlabeled image data, intermediate image data representative of an image of the plurality of items following the removal, by the robotic manipulator, of an item from the plurality of items;
      selecting, from the dataset of unlabeled image data, final image data representative of an image of the plurality of items following the removal, by the robotic manipulator, of another item from the plurality of items; and
      generating the training dataset representative of a notional multi-pick event based on a sequence of unlabeled image data including the first and final image data,
   wherein the robotic control system is configured to:
      output a signal suitable for causing the robotic manipulator to pick an item from a plurality of items within the picking area;
      before stowing the item, determine, based on a signal outputted from the machine learning service, whether or not the robotic manipulator has erroneously picked two items concurrently;
      and, if it is determined that the robotic manipulator has picked two items concurrently, output a signal suitable for causing the robotic manipulator to return the items back in the picking area.

2. The robotic picking system of claim 1, wherein the dataset of unlabeled image data is representative of a sequence of images of the plurality of items to be picked by the robotic manipulator captured over a predetermined period of time.

3. The robotic picking system of claim 1, wherein the method of training a machine learning service comprises removing from the dataset of unlabeled image data all image data captured during a control cycle of the robotic manipulator in which the robotic manipulator failed to remove an item from the plurality of items.

4. The robotic picking system of claim 1, wherein the method of training a machine learning service comprises:

selecting from the dataset of unlabeled image data the intermediate unlabeled image data within a predetermined period following the removal of the item from the plurality of items; and selecting from the dataset of unlabeled image data the final unlabeled image data within a predetermined period following the removal of the other item from the plurality of items.

* * * * *